United States Patent
Xia et al.

(10) Patent No.: US 7,772,820 B2
(45) Date of Patent: Aug. 10, 2010

(54) FEEDBACK AND COMPARISON APPARATUS AND DC-DC VOLTAGE CONVERTER

(75) Inventors: Chun-Hua Xia, Jiangsu Province (CN); Shih-Hao Liu, Taoyuan County (TW)

(73) Assignee: Inventec Corporation, Taipei (TW)

( * ) Notice: Subject to any disclaimer, the term of this patent is extended or adjusted under 35 U.S.C. 154(b) by 447 days.

(21) Appl. No.: 11/961,138

(22) Filed: Dec. 20, 2007

(65) Prior Publication Data

US 2009/0085539 A1    Apr. 2, 2009

(30) Foreign Application Priority Data

Oct. 1, 2007    (TW) ................. 96136777 A

(51) Int. Cl.
    *G05F 1/56* (2006.01)
(52) U.S. Cl. .................... 323/282
(58) Field of Classification Search .......... 323/282
    See application file for complete search history.

(56) References Cited

U.S. PATENT DOCUMENTS

| | | | | |
|---|---|---|---|---|
| 6,137,696 A * | 10/2000 | Hall et al. | ............ | 363/21.05 |
| 6,137,702 A * | 10/2000 | Hall et al. | ............ | 363/95 |
| 7,298,125 B1 * | 11/2007 | Ritter | ............ | 323/288 |
| 2003/0020437 A1 * | 1/2003 | Kanamori | ............ | 323/222 |
| 2007/0152644 A1 * | 7/2007 | Vinn | ............ | 323/266 |
| 2009/0015225 A1 * | 1/2009 | Turchi et al. | ............ | 323/283 |
| 2009/0085539 A1 * | 4/2009 | Xia et al. | ............ | 323/282 |
| 2009/0267583 A1 * | 10/2009 | Hsu et al. | ............ | 323/284 |
| 2009/0295343 A1 * | 12/2009 | Chiu | ............ | 323/234 |
| 2009/0295355 A1 * | 12/2009 | Hirahara | ............ | 323/284 |
| 2010/0045252 A1 * | 2/2010 | Yamamoto | ............ | 323/282 |

FOREIGN PATENT DOCUMENTS

TW    I281305    5/2007

* cited by examiner

*Primary Examiner*—Jeffrey L Sterrett
(74) *Attorney, Agent, or Firm*—J.C. Patents

(57) ABSTRACT

A feedback and comparison apparatus applicable to a DC-DC voltage converter is provided. The feedback and comparison apparatus includes a comparator and a voltage feedback circuit. The voltage feedback circuit includes a first voltage dividing component and a second voltage dividing component. The comparator compares a feedback voltage with a first reference voltage, and outputs a control signal to the DC-DC voltage converter according to the comparing result. One end of the first voltage dividing component is coupled to an output voltage output by the DC-DC voltage converter and the other end of the first voltage dividing component is coupled to one end of the second voltage dividing component, for providing the feedback voltage. The other end of the second voltage dividing component is coupled to a second reference voltage. The present invention is applicable to a situation that the output voltage is smaller than the reference voltage.

13 Claims, 4 Drawing Sheets

FEEDBACK AND COMPARISON APPARATUS AND DC-DC VOLTAGE CONVERTER

CROSS-REFERENCE TO RELATED APPLICATION

This application claims the priority benefit of Taiwan application serial no. 96136777, filed on Oct. 1, 2007. The entirety of the above-mentioned patent application is hereby incorporated by reference herein and made a part of this specification.

BACKGROUND OF THE INVENTION

1. Field of the Invention

The present invention relates to a DC-DC voltage converter. More particularly, the present invention relates to a DC-DC voltage converter with an output voltage lower than a reference voltage.

2. Description of Related Art

As electronic information technique advances, circuit designs of various electronic products become increasingly complex. For many circuit designs, cell voltage is converted to lower power supply voltage, for example mobile phone, PDA and other hand held equipment with power supplied by cell. For example, for portable computer, voltage converter is used in a common power supplier to serve as a basic voltage adjuster, so increasingly more DC-DC voltage converters are used in various electronic products.

The function of the DC-DC voltage converter is outputting an output voltage smaller than an input voltage, and stabilizing the voltage. Referring to FIG. 1, a well-known DC-DC voltage converter 100 is shown. During operation of the DC-DC voltage converter 100 as shown in FIG. 1, it receives a DC input voltage Vin provided by an alkaline cell or a lithium cell, and the DC input voltage Vin is converted to a lower fixed DC output voltage Vout. After the output voltage Vout is fed back by a feedback circuit 101, it is compared with a reference voltage Vref through a comparator 103, and a control signal is generated to a driving circuit 105 according to a comparing result. The driving circuit 105 sends a driving signal to a power circuit 107 according to the received control signal. The power circuit 107 is connected to the input voltage Vin and a voltage stabilizing circuit 109. The power circuit 107 controls conducted/non-conducted state between the input voltage Vin and the voltage stabilizing circuit 109 according to the received driving signal, and then outputs a stable output voltage Vout after being stabilized by the voltage stabilizing circuit 109.

However, in most of the portable electronic products, alkaline cells or lithium cells are used as the electric source. The voltage of the cell may be increasingly reduced with operation time and using time, so in order to obtain a stable output voltage, under many situations, the DC-DC voltage converter adopts boost-buck two-stage voltage converter.

In Taiwan patent No. 1281305, a dual-input voltage converter is provided, which includes a comparator for comparing the output Vout and a reference voltage Vref to generate a signal to a controller, and the controller determines to switch a first voltage converting circuit or a second voltage converting circuit. Referring to FIG. 2, a schematic view of an embodiment of this patent is shown. The first voltage converting circuit is composed of transistors SW1 and SW2, an inductor L and a capacitor Co, and the second voltage converting circuit is composed of transistors SW2 and SW3, the inductor L, and the capacitor Co. The controller 201 switches the transistors SW1 and SW2 to generate a current I to charge the capacitor Co through the inductor L to obtain an output voltage Vout. The comparator 203 compares the output voltage Vout and the reference voltage Vref. When the output voltage Vout is lower than the reference voltage Vref, an output signal Se of the comparator 203 makes the controller 201 turn off the transistor SW1, such that a voltage VDD is converted to a voltage VPP after being boosted by a boost converter 205. The controller 201 switches the transistors SW2 and SW3 to convert the voltage VPP to the output voltage Vout, such that the dual-input voltage converter 200 can be considered as a boost-buck two-stage voltage converter, and avoids the situation that the output voltage Vout is reduced due to the reduce of the input voltage Vin and thus causing an unstable output. However, the current DC-DC converter still has some defects which are described as follows.

1. Although the two-stage voltage converter can solve the situation that the reduction of the input voltage Vin results in the unstable output voltage Vout, it cannot operate under a state that the output voltage Vout is smaller than the reference voltage Vref, and it depends on the boost converter to make the output voltage Vout maintain at the state of being larger than the reference voltage Vref. However, low operating voltage enables the electronic product integrate more transistors on a single chip, so in practical application, various electronic products use low voltage increasingly. Through prediction of "International Technology Roadmap for Semiconductors (ITRS)" issued by Semiconductor Industry Association (SIA), in the period from now to the year of 2016, operating voltage and operating current of IC will respectively show falling and rising trends. It can be known that the output voltage Vout of the voltage converter required by many electronic products becomes increasingly smaller, so as to directly result in the difficulty of selecting value of the reference voltage Vref. A situation that the output voltage Vout is smaller than the reference voltage Vref occurs more frequently. It is impossible for the conventional DC-DC voltage converter to operate under the situation that the output voltage Vout is smaller than the reference voltage Vref, and it is a blind spot in the design of the DC-DC voltage converter.

2. Under the situation that the output voltage Vout is smaller than the reference voltage Vref, the dual-input voltage converter adopts the method of boosting and then bucking. However, it is necessary to add a boost converter, a voltage converting circuit, and some other related electronic components in the circuit. However, PCB space of the current DC-DC voltage converter is quite limited, which does not satisfy the developing trend of the modern electronic product of "a small size with big function". The DC-DC voltage converter is widely used in the electronic products, and the increase of the electronic components in the DC-DC voltage converter will result in the increase of manufacturing cost.

SUMMARY OF THE INVENTION

Accordingly, the present invention is directed to a feedback and comparison apparatus, which may be able to overcome the disadvantage of the conventional art described above.

The present invention is further directed to a DC-DC voltage converter capable of converting an input voltage to a lower output voltage under the situation that the output voltage is smaller than the reference voltage.

The present invention provides a feedback and comparison apparatus applicable to a DC-DC voltage converter. The feedback and comparison apparatus includes a comparator and a voltage feedback circuit. The comparator has a first input end, a second input end, and an output end. The first input end is coupled to a feedback voltage, the second input end is coupled to a first reference voltage, and the output end is coupled to the DC-DC voltage converter. The comparator compares the feedback voltage with the first reference voltage, and outputs a control signal to the DC-DC voltage converter according to a comparison result. The voltage feedback circuit is coupled to the comparator for receiving a second reference voltage and an output voltage output by the DC-DC voltage converter, so as to obtain the feedback voltage, in which the feedback voltage is greater than the output voltage.

The feedback and comparison apparatus according to the present embodiment of the present invention includes a first voltage dividing component and a second voltage dividing component. One end of the first voltage dividing component is coupled to the output voltage output by the DC-DC voltage converter and the other end provides the feedback voltage. One end of the second voltage dividing component is coupled to one end of the first voltage dividing component providing the feedback voltage, and the other end is coupled to the second reference voltage.

The present invention also provides a DC-DC voltage converter for converting an input voltage to obtain an output voltage. The DC-DC voltage converter includes a feedback and comparison apparatus, a driving circuit, a power circuit, and a voltage stabilizing circuit. The feedback and comparison apparatus receives a first reference voltage, a second reference voltage, and an output voltage, so as to obtain a feedback voltage according to the output voltage and the second reference voltage, and compares the feedback voltage with the first reference voltage to output a control signal according to a comparing result, in which the feedback voltage is greater than the output voltage. The driving circuit is coupled to the feedback and comparison apparatus, for receiving the control signal output by the feedback and comparison apparatus, and modulates and outputs a driving signal. The power circuit is coupled to the driving circuit for receiving the driving signal output by the driving circuit, and controlling conducted/non-conducted state of a path through which the input voltage provides electric energy to an output of the power circuit according to the driving signal. The voltage stabilizing circuit is coupled to the power circuit for receiving the output of the power circuit and outputting the output voltage after being stabilized.

In the present invention, the feedback and comparison apparatus is adopted such that the input voltage can be converted to a lower output voltage under the situation that the output voltage is smaller than the reference voltage, such that a problem due to a blind spot of the current DC-DC voltage converter design is resolved, and it is more suitable for the developing trend of the electronic products. The structure of the DC-DC voltage converter of the present invention is simple, which involves merely changing connection position of the voltage dividing components, and therefore no additional cost on the manufacturing cost is incurred.

In order to make the aforementioned and other objects, features and advantages of the present invention comprehensible, embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
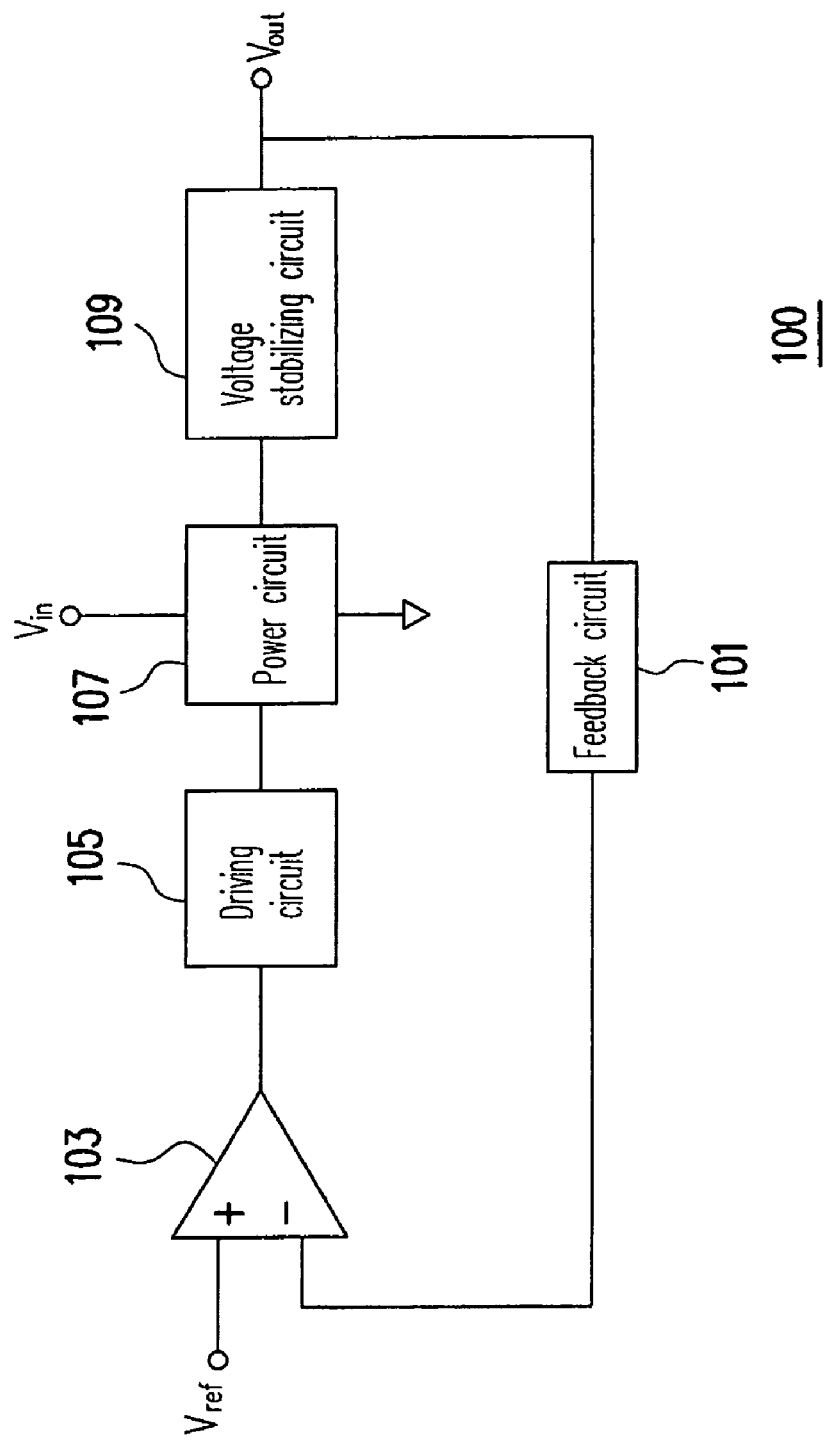
FIG. 1 is a circuit diagram of a well-known DC-DC voltage converter.
Figure 2:
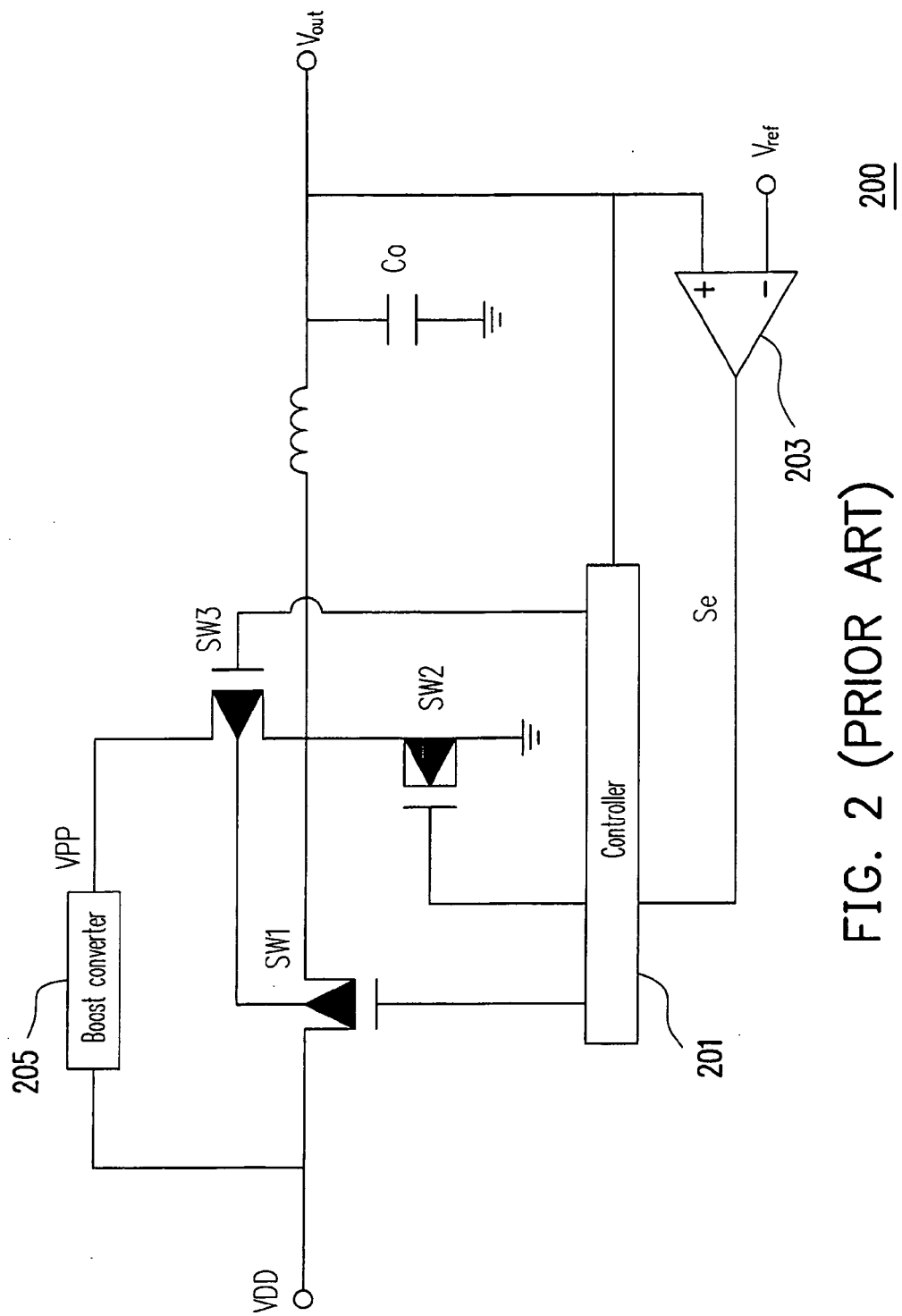
FIG. 2 is a circuit diagram of an embodiment of Taiwan patent No. 1281305.
Figure 3:
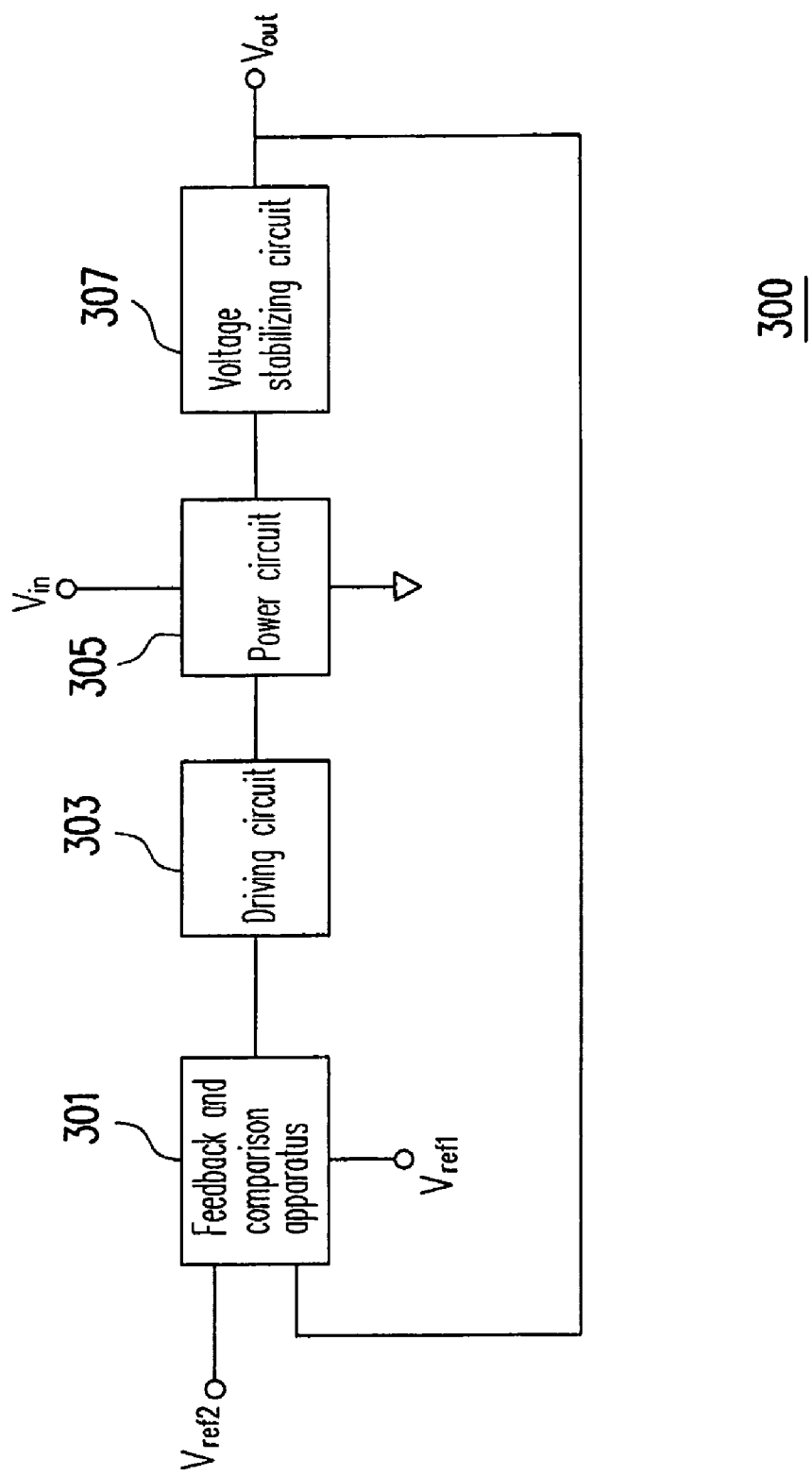
FIG. 3 is a circuit architecture diagram of a DC-DC voltage converter according to an embodiment of the present invention.

FIG. 3 shows a circuit architecture diagram of a DC-DC voltage converter according to an embodiment of the present invention.

A DC-DC voltage converter 300 of the present invention is used for converting an input voltage Vin to a lower output voltage Vout under a situation that the output voltage Vout is lower than a reference voltage Vref. The DC-DC voltage converter 300 includes a feedback and comparison apparatus 301, a driving circuit 303, a power circuit 305, and a voltage stabilizing circuit 307. The feedback and comparison apparatus 301 receives a first reference voltage Vref1, a second reference voltage Vref2, and an output voltage Vout. The driving circuit 303 is coupled to the feedback and comparison apparatus 301, the power circuit 305 is coupled to the driving circuit 303, and the voltage stabilizing circuit 307 is coupled to the power circuit 305. During operation, after receiving the first reference voltage Vref1, the second reference voltage Vref2, and the output voltage Vout, the feedback and comparison apparatus 301 obtain a feedback voltage according to the output voltage Vout and the second reference voltage Vref2, then compares the feedback voltage and the first reference voltage Vref1, and outputs a control signal to the driving circuit 303 according to a comparison result. The driving circuit 303 receives the control signal output by the feedback and comparison apparatus 301, and outputs a driving signal to the power circuit 305 after modulating according to the control signal. After receiving the driving signal output by the driving circuit 303, the power circuit 305 turns on (conducts) or turns off (non-conducts) the path via the input voltage Vin that provides electric energy to an output of the power circuit 305 according to the driving signal. Finally, after the output of the power circuit 305 is stabilized by the voltage stabilizing circuit 307, the stable output voltage Vout is output. The power circuit 305 can be a circuit having switch characteristic and composed of a switch or a transistor or other switching components. The voltage stabilizing circuit 307 can be composed of an inductor and a capacitor, after the capacitor is charged by current passing through the inductor, the stabilized output voltage Vout is output.

Figure 4:
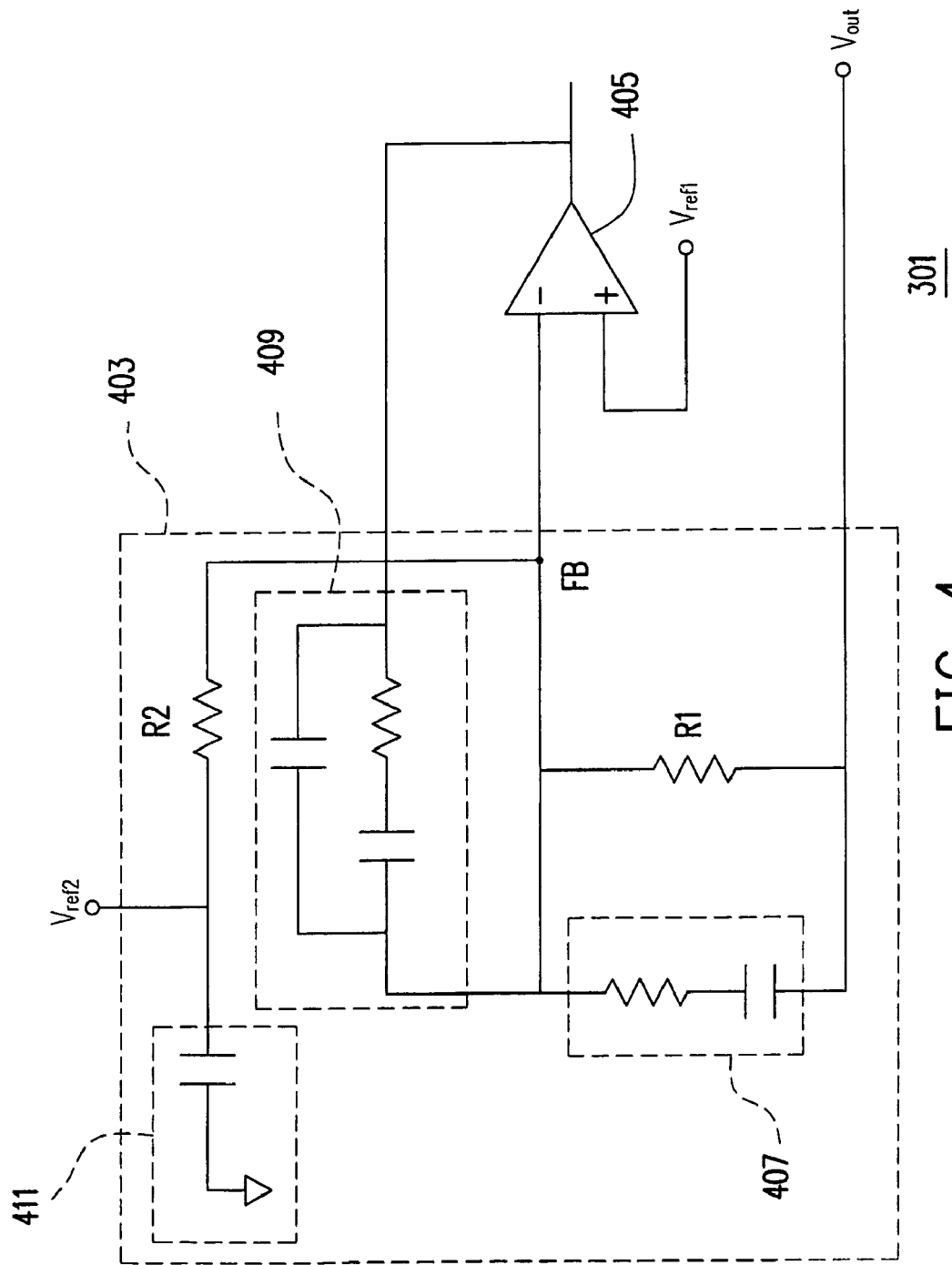
FIG. 4 is a circuit diagram of the feedback and comparison apparatus in FIG. 3 according to an embodiment of the present invention.

FIG. 4 shows a circuit diagram of the feedback and comparison apparatus in FIG. 3 according to an embodiment of the present invention.

The feedback and comparison apparatus of the present invention is applicable to a DC-DC voltage converter. The feedback and comparison apparatus 301 includes a comparator 405 and a voltage feedback circuit 403. The voltage feedback circuit 403 is coupled to the comparator 405 for receiving the second reference voltage Vref2 and the output voltage Vout output by the DC-DC voltage converter 300, so as to obtain the feedback voltage (voltage of point FB in FIG. 4), and the feedback voltage is always greater than the output voltage Vout. The comparator 405 has a first input end, a second input end, and an output end. The first input end is coupled to the feedback voltage, the second input end is coupled to the first reference voltage Vref1, and the output end is coupled to the DC-DC voltage converter 300. The comparator 405 compares the feedback voltage with the first reference voltage Vref1, and outputs a control signal to the DC-DC voltage converter 300 according to a comparison result. The voltage feedback circuit 403 further includes a first voltage dividing component (in this embodiment, the first voltage dividing component is a resistor R1) and a second voltage dividing component (in this embodiment, the second voltage dividing component is a resistor R2). One end of the first voltage dividing component is coupled to the output voltage Vout output by the DC-DC voltage converter 300, and the other end provides the feedback voltage. One end of the second voltage dividing component is coupled to one end of the first voltage dividing component providing the feedback voltage, and the other end is coupled to the second reference voltage Vref2. The second reference voltage Vref2 is greater than the first reference voltage Vref1, and the proportion relation of the first reference voltage Vref1 and the second reference voltage Vref2 can be adjusted by users. In this embodiment, the first voltage dividing component and the second voltage dividing component respectively adopts the resistor R1 and the resistor R2, but it is not used to limit the present invention, passive components such as inductors and capacitors, or other components capable of resulting in voltage dividing effect are all available. In this embodiment, when the resistors are used, according to changing critical point of the control signal output by the comparator 103, an equation may be obtained as follows.

$$Vref1=(R1/(R1+R2))*Vref2+(R2/(R2+R1))*Vout \quad \text{(Equation 1)}$$

The equation 2 is deduced as follows.

$$R2/R1=(Vref2-Vref1)/(Vref1-Vout) \quad \text{(Equation 2)}$$

If the second reference voltage Vref2 is set to be twice of the first reference voltage Vref1, at this time, then the following equation 3 can be obtained.

$$R2/R1=Vref1/(Vref1-Vout) \quad \text{(Equation 3)}$$

At this time, the value of the resistor R2 may be expressed by the following equation 4:

$$R2=R1*Vref1/(Vref1-Vout) \quad \text{(Equation 4)}$$

It can be known from the above equation 3 that in this embodiment, the output voltage Vout can be controlled by controlling the ratio of R2/R1. When the value of R1 is fixed, it can be calculated from the equation 4 that the value of R2 can be calculated according to the output voltage Vout and the reference voltage. Therefore, if the value of R1 and the reference voltage are fixed, when it is necessary to change the output voltage Vout, it is only necessary to change the value of the resistor of R2. When the DC-DC voltage converter 300 operates, the comparator 103 outputs a control signal to the driving circuit 303 by comparing the magnitude of the feedback voltage of point FB and the first reference voltage Vref1. After receiving the control signal output by the feedback and comparison apparatus 301, the driving circuit 303 outputs a driving signal to the power circuit 305 according to the control signal. After receiving the driving signal output by the driving circuit 303, the power circuit 305 controls the conducted/non-conducted state of the path through which the input voltage Vin provides the electric energy to the output of the power circuit 305 according to the driving signal. Finally, after the output of the power circuit 305 is stabilized through the voltage stabilizing circuit 307, the stabilized output voltage Vout is output. In addition, in order to maintain signal frequency in the circuit within a reference scope, the feedback and comparison apparatus 301 includes a first filtering sub circuit 407, a second filtering sub circuit 409, and a third filtering sub circuit 411. The first filtering sub circuit 407 is connected between the first reference voltage Vref1 and the first voltage dividing component (in this embodiment, the first voltage dividing component is the resistor R1). The second filtering sub circuit 409 is connected to the comparator 103. The third filtering sub circuit 411 is connected to the second voltage dividing component (in this embodiment, the second voltage dividing component is the resistor R2).

To sum up, the feedback and comparison apparatus of the present invention can be externally connected to the DC-DC voltage converter, or can also be integrated in the DC-DC voltage converter, so as to control the output voltage Vout by controlling the first voltage dividing component or the second voltage dividing component. In addition to operating under the situation that the output voltage Vout is higher than the reference voltage, the present invention can also operate under the situation that the output voltage Vout is lower than the reference voltage, so as to overcome a design blind spot of the current DC-DC voltage converter. For the increasingly lower operating voltage of various electronic products in future, the DC-DC voltage converter of the present invention is more suitable for the developing trend. The present invention realizes the technical breakthrough only by changing connection positions of the internal resistor components, and thus operating efficiency of the DC-DC voltage converter is not reduced, and the manufacturing cost is not increased, thereby satisfying the developing slogan of the electronic product of "a small size with big function".

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A feedback and comparison apparatus, suitable for a DC-DC voltage converter, comprising:
   a comparator, having a first input end, a second input end and an output end, wherein the first input end is coupled to a feedback voltage, the second input end is coupled to a first reference voltage, the output end is coupled to the DC-DC voltage converter, and the comparator compares the feedback voltage with the first reference voltage and outputs a control signal to the DC-DC voltage converter according to a comparing result; and
   a voltage feedback circuit, coupled to the comparator, for receiving a second reference voltage and an output voltage output by the DC-DC voltage converter, so as to obtain the feedback voltage which is higher than the output voltage.

2. The feedback and comparison apparatus as claimed in claim 1, wherein the voltage feedback circuit comprises:
   a first voltage dividing component, with one end thereof coupled to the output voltage output by the DC-DC voltage converter and another end thereof providing the feedback voltage; and
   a second voltage dividing component, with one end thereof coupled to an end of the first voltage dividing component providing the feedback voltage and another end thereof coupled to the second reference voltage.

3. The feedback and comparison apparatus as claimed in claim 2, wherein the voltage feedback circuit further comprises a compensation circuit, and the compensation circuit comprises:
- a first filtering sub circuit, with one end thereof connected to the output voltage and another end thereof connected to the feedback voltage;
- a second filtering sub circuit, with one end thereof connected to the feedback voltage and another end thereof connected to the output end of the comparator; and
- a third filtering sub circuit, with one end thereof connected to the second reference voltage and another end thereof grounded.

4. The feedback and comparison apparatus as claimed in claim 2, wherein the first voltage dividing component comprises a first resistor.

5. The feedback and comparison apparatus as claimed in claim 2, wherein the second voltage dividing component comprises a second resistor.

6. The feedback and comparison apparatus as claimed in claim 1, wherein a value of the second reference voltage is greater than a value of the first reference voltage.

7. A DC-DC voltage converter, for converting an input voltage to obtain an output voltage, comprising:
- a feedback and comparison apparatus, for receiving a first reference voltage, a second reference voltage, and the output voltage, so as to obtain a feedback voltage according to the output voltage and the second reference voltage, and comparing the feedback voltage with the first reference voltage to output a control signal according to a comparing result, wherein the feedback voltage is larger than the output voltage;
- a driving circuit, coupled to the feedback and comparison apparatus, for receiving the control signal output by the feedback and comparison apparatus, and modulating and outputting a driving signal according to the control signal;
- a power circuit, coupled to the driving circuit, for receiving the driving signal, and turning on or turning off a path through which the input voltage provides electric energy to an output of the power circuit according to the driving signal; and
- a voltage stabilizing circuit, coupled to the power circuit, for receiving the output of the power circuit and outputting the output voltage after being stabilized.

8. The DC-DC voltage converter as claimed in claim 7, wherein the feedback and comparison apparatus comprises:
- a comparator, having a first input end, a second input end, and an output end, wherein the first input end is coupled to a feedback voltage, the second input end is coupled to the first reference voltage, the output end is coupled to the DC-DC voltage converter, the comparator compares the feedback voltage with the first reference voltage, and outputs the control signal to the DC-DC voltage converter according to a comparing result; and
- a voltage feedback circuit, coupled to the comparator, for receiving the second reference voltage and the output voltage output by the DC-DC voltage converter, so as to obtain the feedback voltage which is higher than the output voltage.

9. The DC-DC voltage converter as claimed in claim 8, wherein the voltage feedback circuit comprises:
- a first voltage dividing component, with one end thereof coupled to the output voltage output by the DC-DC voltage converter and another end thereof providing the feedback voltage; and
- a second voltage dividing component, with one end thereof coupled to an end of the first voltage dividing component providing the feedback voltage and another end thereof coupled to the second reference voltage.

10. The DC-DC voltage converter as claimed in claim 9, wherein the voltage feedback circuit further comprises a compensation circuit, and the compensation circuit comprises:
- a first filtering sub circuit, with one end thereof connected to the output voltage and another end thereof connected to the feedback voltage;
- a second filtering sub circuit, with one end thereof connected to the feedback voltage and another end connected to the output end of the comparator; and
- a third filtering sub circuit, with one end thereof connected to the second reference voltage and another end grounded.

11. The DC-DC voltage converter as claimed in claim 9, wherein the first voltage dividing component comprises a first resistor.

12. The DC-DC voltage converter as claimed in claim 9, wherein the second voltage dividing component comprises a second resistor.

13. The DC-DC voltage converter as claimed in claim 7, wherein a value of the second reference voltage is greater than a value of the first reference voltage.

* * * * *